United States Patent [19]
Qvarfordh et al.

[11] Patent Number: 6,082,405
[45] Date of Patent: Jul. 4, 2000

[54] VALVE CONE, A VALVE AND A VALVE MANUFACTURING PROCESS

[75] Inventors: Patrik Qvarfordh; Jonas Wall, both of Vellinge; Nils Hjelte, Malmö; Göran Dahl, Lund; Christer Hernrup, Malmö, all of Sweden

[73] Assignee: Tac AB, Malmo, Sweden

[21] Appl. No.: 09/224,714

[22] Filed: Dec. 31, 1998

Related U.S. Application Data

[63] Continuation of application No. PCT/SE97/01254, Jul. 9, 1997.

[30] Foreign Application Priority Data

Jul. 9, 1996 [SE] Sweden ................................ 9602743

[51] Int. Cl.[7] ...................................................... F16K 1/54
[52] U.S. Cl. ................................ 137/625.37; 137/625.33
[58] Field of Search ........................... 137/625.33, 625.37

[56] References Cited

U.S. PATENT DOCUMENTS 3,187,775  6/1965  Pinnell .
4,795,131  1/1989  Scaranol et al. .................... 137/625.37

FOREIGN PATENT DOCUMENTS 10457132  11/1991  European Pat. Off. .
1062507   11/1952  Germany .
1816002   12/1968  Germany .

*Primary Examiner*—John Fox

[57] ABSTRACT

A valve cone comprises a cylindrical body extending along a longitudinal axis. The body has a cylindrical surface with at least one, axially extending recess. The recess extends inside a contour line between a first end position at a first end of the cylindrical body and a second end position, which is located between the first end of the body and the opposite second end of the body. The cross-sectional area of the recess, in a plane perpendicular to its longitudinal axis, gradually decreases from a maximum value close to the said first end towards the second end position. A valve cone of the type described above is arranged in a valve. In a method for manufacturing the valve cone, the radial recesses are formed by cutting in a single axial-radial cutting motion.

14 Claims, 1 Drawing Sheet

VALVE CONE, A VALVE AND A VALVE MANUFACTURING PROCESS

This application is a Continuation of PCT application Ser. No. PCT/SE97/01254 filed on Jul. 9, 1997, which designated the United States and on which priority is claimed under 35 U.S.C. §120, the entire contents of which are hereby incorporated by reference.

FIELD OF THE INVENTION

The present invention relates to a valve cone, a valve and a method of manufacturing a valve cone.

BACKGROUND OF THE INVENTION

In valves of the cone valve type, use is made of a valve cone for controlling a flow in coaction with a seat. Such valve cones can be designed in various ways.

DE-10 62 507 discloses a valve cone, which in a first end is connected to a valve stem and in a second end is arranged to cooperate with a valve seat. When the valve is closed, the cone is pressed by the valve stem against the seat for sealing against the same (pressing closure).

The cone is formed with a radially through slot extending in the axial direction in the form of a V. The cone is opened and closed in the axial direction and is controlled in the radial direction by means of the valve stem.

With this valve design, good controllability can be achieved merely within a very limited range. Besides, a tapering cone causes great changes in flow close to the closed position, thereby preventing good controllability for small flows.

Since the axial guiding of the cone is effected on the one hand by means of the stem and, on the other hand, at an axial distance from the seat, the cone produces and conveys vibrations when a fluid flows through the valve, which in itself results in a high sound level and the valve being worn.

DE 18 16 002 discloses an asymmetrical fish-mouth-like valve cone with a recessed groove, which via an end portion of the cone extends axially from one side to the opposite side. The groove extends over different distances on the different sides and the respective end portions of the groove are narrow in the circumferential direction and deep in the radial direction.

The last-mentioned cone is, owing to its asymmetry, sensitive to being set at an angle and, in operation, is subjected to uneven loads, which causes premature wear of the valve.

The valve cones described above both suffer from the drawback of having a complicated shape, which implies that they are complicated and expensive to manufacture. The complicated shape also results in the cones being difficult to calculate and dimension.

Moreover, the two valve cones described above are intended to be operated with pressing closure, in which the valve stem is subjected to bending stress when the valve is closed. The harder the valve is pressed against the seat, the greater bending stress is produced. This leads to the stem gradually being bent, in which case the cone can be located off-centre in the seat and cause uneven wear thereof.

EP-0 457 132 discloses a valve cone having V-shaped axial grooves of triangular cross-section and different length. The valve cone is intended for the control of flows of liquid food products and for operating with so-called pressing closure.

This cone has good controllability merely within a very limited range. Large flows through the triangular grooves are not allowed.

Information sheets from Hansen Technologies Corporation, Burr Ridge, Ill., USA, describe a valve having a V gate and four V-shaped recesses which define a crown. At the lower part of the crown, the recesses immediately have a relatively large radial depth. The valve stem is connected to the open end of the crown, and contrary to those described above, the cone is intended for pulling closure. By pulling closure is meant in connection with the invention that the valve cone, when the valve is closed, is actuated by means of an actuator, for instance a valve stem, with a pulling force acting in the direction of the closed position, contrary to pressing closure.

This construction has a complicated form and thus is difficult to calculate and expensive to manufacture. This design can only with great difficulty be obtained by machining. Moulding such a valve cone causes several drawbacks. The production will be expensive since expensive tools are necessary. Besides, the tolerance spread will be broad in such a method.

OBJECTS OF THE INVENTION

One object of the invention is to provide a valve cone which is improved relative to the prior-art technique as described above.

A particular object of the invention is to provide a valve cone which results in good controllability within a wide range at the same time as a particularly good precise controllability is obtained for very small flows.

A special object of the invention is to provide a valve cone which is simple and inexpensive to manufacture.

One more object of the invention is to provide a valve cone, whose function is affected very little by manufacturing tolerances.

SUMMARY OF THE INVENTION

According to the invention, these and other objects which will appear from the following description are now achieved by means of a valve cone, a valve and a method of manufacturing a valve cone according to the present invention.

By the cone body of the valve cone having in a preferred embodiment a boundary line which is continuously concave towards the recess, in a cross-section perpendicular to the cone body, a simplified dimensioning is rendered possible since a continuous distribution of flow is achieved in the entire cross-section of the recess. Moreover owing to the absence of sharp edges a simplified production of the recess is achieved by the fact that removing machining can be used in a simple manner.

Since in a preferred embodiment the width is greater than the depth of that portion of the recess which is located closest to that end position of the recess towards which the cross-sectional area of the recess decreases, smooth changes of said cross-sectional area are ensured. As a result, a very fine control of small flows is accomplished.

Taken together, these two features result in substantial improvements of the controllability of valve cones at the same time as they can be manufactured in a simple way with relatively rough tolerances while maintaining good controllability.

The design of the inventive valve cone is advantageously obtained by the inventive method for producing a radial recess by means of axial milling in a single milling motion, which means extremely simplified manufacture compared with previously applied manufacturing methods for such valves. Moreover, the accuracy of the milling motion can, while maintaining good controllability of the finished valve cone, be allowed to be comparatively low in this manufacturing method. Furthermore, with a minimum degree of removal of material a valve cone is obtained, which has good controllability within a very wide range.

According to an embodiment of the invention, a valve cone comprises two to five axial recesses, thereby achieving a distribution of the flow and the radial forces acting on the cone. Preferably the recesses are of the same length and distributed equiangularly along the circumference of the cone. This guarantees a symmetrical flow round the cone and symmetrical forces acting on the cone during controlling.

It is especially preferred that the number of recesses be four, which in practical experiments has been found to result in an advantageous relationship between the depth and width of the recesses along their length.

According to another embodiment of the invention, said continuously concave boundary line is concave in a rounded manner, preferably elliptic. The rounder the boundary line, the more even distribution of flow is achieved in the cross-section of the recess.

According to a particularly preferred embodiment, the elliptic boundary line has the form of a part of the periphery of a circle. In connection with the invention, a circle is considered an extreme case of an ellipse. This shape is very advantageous in the production of recesses in the cone by means of milling since the shape of the recesses thus corresponds to a segment of a milling cutter directed in parallel with the longitudinal axis of the cone. Consequently, the milling cutter need not be moved in the circumferential direction during the manufacturing procedure, but only in the axial and radial direction.

In a special embodiment, the radius of said circle sector is in the range of 0.25–0.75 R1, R1 being the radius of the cone. In these ratios of the radii, excellent controllability has been achieved in practical experiments. Extremely good results have been obtained with a circle sector area in the range of 0.50–0.64 R1.

According to one more embodiment of the invention, the valve cone is adapted to operate with so-called pulling closure, in which an actuator, for instance a valve stem, projects from that end of the cone body from which the recess extends. Compared with valves for pulling closure, the function of the actuator is thus improved as well as the function of the valve in its entirety, at the same time as the wear decreases and the service life of the parts included in the valve increases.

In an embodiment of the invention, the cone is adapted to be guided radially in the seat of the valve, in which case the recess, at that end of the cone body from which the recess extends, is circumferentially surrounded by portions of radial extent. This results in a crown being formed, by means of which said controlling is effected when the valve is in its maximum open state. The radial extent of the portions surrounding the recess in the end guarantees the cone good strength in the radial direction also when the valve is completely open.

According to a further particularly preferred embodiment, the recess has a longitudinal section, in a plane along the longitudinal axis, in which the boundary line of the body towards the recess has a substantially continuous bend, preferably a convex bend. The continuous bend ensures a uniform flow along the entire recess. A convex bend of said boundary line besides ensures good controllability within a wide range as well as a particularly good controllability for small flows.

According to one aspect of the invention, it comprises a valve having a valve cone according to the invention cooperating with a valve seat. In a preferred embodiment of the valve, radial guiding of the valve cone is effected by cooperation between the cylindrical surface of the valve cone and a surface associated with the valve seat and facing the longitudinal axis of the valve cone. This ensures uniform guiding of the valve in the area where loads arise. This embodiment can advantageously be combined with a control stem which is arranged for pulling closure.

The various embodiments may advantageously be combined with each other or with other features of embodiments of the invention, as will be described below.

BRIEF DESCRIPTION OF THE DRAWINGS

The invention will now be described in more detail with reference to the accompanying drawings, which illustrate a non-limiting embodiment and in which.

DESCRIPTION OF AN EMBODIMENT OF THE INVENTION

Figure 1:
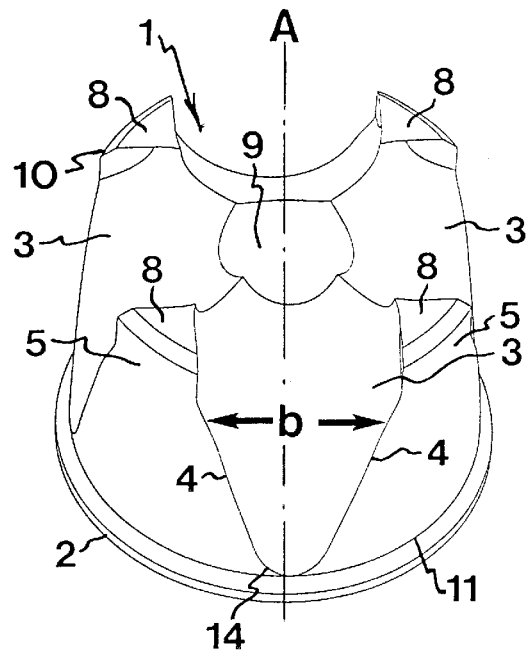
FIG. 1 is a perspective view of a valve cone according to a preferred embodiment.

FIG. 1 shows a valve cone according to the invention, which is intended to be used in a valve. The valve cone comprises a cylindrical body 1, preferably circular-cylindrical, which extends along a longitudinal axis A. The body 1 is preferably made of metal and has a cylindrical surface 5 with four axial recesses. The recesses are uniform and distributed equiangularly around the circumference. An outwardly convex contour line 4 extending around each recess 3 constitutes a limit between the respective recesses 3 and the cylindrical surface 5. The recesses 3 extend between a first end position at a first upper end 10 of the cylindrical body 1 and a second end position 14 between the first end 10 of the body and the opposite second end 11 of the body. The recess 3 has a radial depth d and a width b in a cross-section in a plane perpendicular to the longitudinal axis A, and the area of the cross-section decreases gradually from a maximum value close to the first end 10 towards the second end position 14.

In the second lower end 11 of the body 1 there is formed an annular shoulder, which is adapted to seal against a valve seat. The shoulder further contributes to defining an end position when closing the valve.

Owing to the shape of the valve cone, the cylindrical surface 5 of the valve cone is suited to constitute a guiding surface in a valve seat. At the first end 10 of the cylindrical body 1, the recess 3 is circumferentially surrounded by portions 8 of radial extent. As a result, a guiding crown is formed, on the outside of which the cylindrical surface 5 extends for guiding the cone in the maximally open state of the cone.

Axially through the body 1 extends a central bore 9, which is adapted to receive a valve stem. The valve stem can be arranged in an optional direction in the valve cone, which is a great advantage and makes the valve cone usable in different types of valves. However, the valve stem is preferably arranged so as to project from that end 10 of the body 1 where the recesses 3 are at their deepest, i.e. adjacent to the crown, so as to operate with so-called pulling closure.

Figure 2:
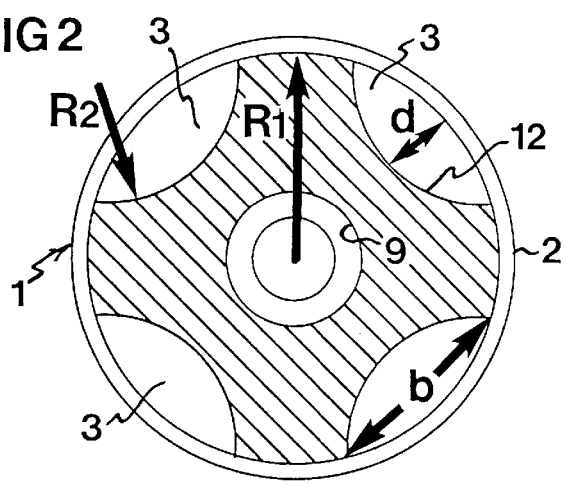
FIG. 2 is a cross-sectional view of the valve cone in FIG. 1.

FIG. 2 illustrates the cylindrical body 1 of the cone in a cross-section perpendicular to the longitudinal axis A. In this cross-section, the body 1 forms a boundary line 12 which is continuously concave towards each of the recesses 3, i.e. the boundary line 12 is not convex in any individual point. Preferably the boundary line is concave in a rounded manner, i.e. it has no sharp steps.

In the embodiment illustrated, the boundary line 12 is elliptic and especially circular with a constant radius R2. In connection with the ratios of the radii which are preferred for the invention, R2 is at least 0.25 R1, R1 being the radius of the cylindrical body 1 of the cone, and more preferred at least 0.5 R1. The preferred radius of the boundary line 12 further is at most 0.75 R1 and more preferred at most 0.64 R1.

As is also evident from FIG. 2, the recesses 3 have a width b greater than the depth d. In the ratio of R1 to R2 in the illustrated embodiment, the width b is considerably greater than the depth d in the shallowest portion of the recess 3. It is only in the deepest third of the recess that the depth d is >0.5 b.

Figure 3:
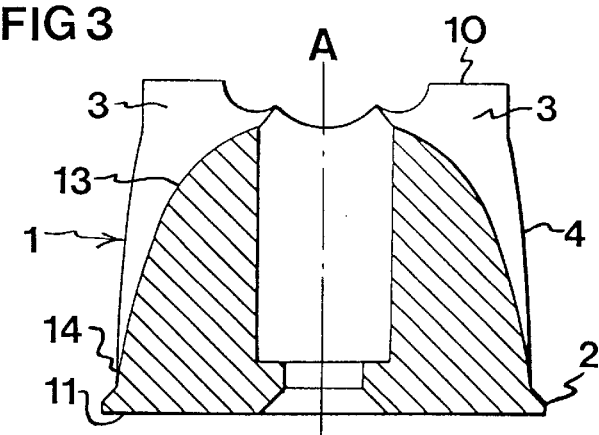
FIG. 3 is a longitudinal section of the valve cone in FIG. 2.

FIG. 3 shows the cylindrical body of the valve cone in a longitudinal section, in a plane along the longitudinal axis A. As appears from the Figure, the boundary line 13 of the body 1 has towards the recess a continuous, preferably convex bend. The radius of bending is very great in the second end position 14 and may preferably be endless. The radius of bending then decreases as the distance to the end position 14 increases.

Figure 4:
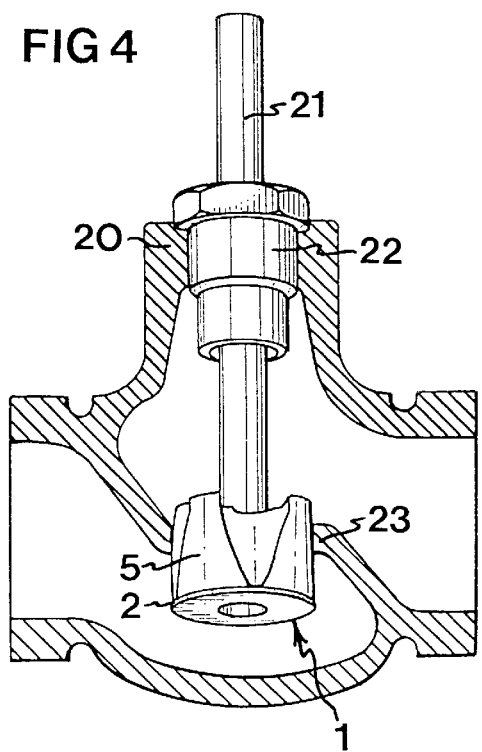
FIG. 4 is a schematic view, partly in cross-section, of a valve according to an embodiment of the invention.

FIG. 4 illustrates schematically a preferred embodiment of the valve with a valve cone of the type described above. The valve comprises a valve housing 20 and a packing box 22 through which extends a valve stem 21. The valve housing contains as throttling means a valve cone which is fixed to one end of the valve stem 21 and which is of the type described above. A valve seat 23 is arranged centrally in the valve housing 20. The cylindrical surface 5 of the valve cone is guided in the seat by means of a matching, internally cylindrical surface. The valve shown operates with pulling closure. In the closed position of the valve, the annular shoulder abuts against a matching surface of the valve seat. The combination of the valve cone according to the invention and guiding both in the valve seat and in the packing box as well as the mode of operation of the valve with pulling closure has resulted in a valve with extremely good controlling properties as well as a long service life and low manufacturing cost.

In the method of manufacturing a valve cone according to the invention, the recesses are formed by axial milling in a cylindrical blank. In the method, use is made of a circularly machining milling cutter, preferably a shell end milling cutter.

According to the preferred method, the cylindrical blank is fixed, whereupon cutting machining by means of a shell end milling cutter is carried out starting from the first end of the cylindrical blank. The rotating milling cutter is then moved axially forwards in the blank while being moved straight outwards along a line extending from the longitudinal axis of the blank. This direction of machining has been found to permit a rapid and uncomplicated milling process.

In a preferred method of manufacturing the valve cone, the axis of the milling cutter is essentially parallel with the longitudinal axis of the cylindrical blank during the milling procedure. This has been found to result in a favourable shape of the recesses.

Each of the recesses is formed in a single axial-radial milling motion. As a result, the shape of the recesses will be controlled by the diameter of the milling cutter, the angle of the milling cutter and the ratio of axial motion to radial motion.

The method of manufacturing the valve cone is advantageously carried out by means of a programmable milling cutter.

The valve cone and the valve according to the invention are suited to control flows of various fluids. An especially suitable field of application is the controlling of liquids, above all controlling of water flows, for instance in heating plants.

Finally, it should be pointed out that the invention is in no way restricted to the embodiments described above, and several modifications thereof are possible within the inventive idea that will be expressed in the appended claims.

The inventive valve cone can, instead of being machined from a metal blank, be produced in a casting process. For various applications, it is also possible to make a valve cone according to the invention of plastic by, for instance, injection moulding.

For example, it is possible to form suitable recesses by means of a laterally machining milling cutter, e.g. an end mill, or a combined milling cutter which operates axially as well as laterally.

Besides, it is possible to form, with a slightly angled shell end milling cutter and/or a laterally machining milling cutter, recesses by machining in the opposite direction relative to the above-described preferred method.

What is claimed is:

1. A valve cone comprising a cylindrical body extending along a longitudinal axis and having a cylindrical surface and at least one, axially extending recess which, inside a contour line, extends between a first end position at a first end of the cylindrical body and a second end position between the first end of the body and the opposite second end of the body, the recess having a radial depth and a width, the recess having a cross-section, in a plane perpendicular to the longitudinal axis, the area of which gradually decreases from a maximum value close to said first end towards the second end position, and the body in said cross-section perpendicular to the longitudinal axis having a boundary line which is continuously concave towards the recess, characterized in that the portion of the recess which extend from the second end position has a width greater than its depth and, the recess has a longitudinal section, in a plane along the longitudinal axis, in which the boundary line of the body towards the recess has an essentially continuous convex bend.

2. A valve cone as claimed in claim 1, which has 2–5 axially extending recesses.

3. A valve cone as claimed in claim 2, which has four recesses.

4. A valve cone as claimed in claim 1, wherein said continuously concave boundary line of the body is concave in a rounded fashion towards the recess.

5. A valve cone as claimed in claim 4, wherein said concave boundary line constitutes part of the periphery of a circle having the radius R2.

6. A valve cone as claimed in claim 5, wherein the cylindrical body has a radius R1, the radius R2 being the range of 0.25 R1–0.75 R1.

7. A valve cone as claimed in claim 1, wherein said portion having a width greater than its depth comprises the axial extent of at least half the recess.

8. A valve cone as claimed in claim 1, wherein an annular abutment is located in the second end of the cylindrical body.

9. A valve cone as claimed in claim 1, wherein an actuator projects from the first end.

10. A valve cone as claimed in claim 1, wherein the recess at the first end of the cylindrical body is circumferentially surrounded by portions having a radial extent.

11. A valve cone as claimed in claim 1, wherein the contour line of the recess is outwardly convex.

12. A valve comprising a valve cone coacting with a valve seat, characterised in that the valve comprises a valve cone according to claim 1.

13. A valve as claimed in claim 12, wherein radial controlling of the valve cone is accomplished by coaction between the cylindrical surface of the valve cone and a surface associated with the valve seat and facing the longitudinal axis of the valve cone.

14. A valve cone as claimed in claim 5, wherein the cylindrical body has a radius R1, the radius R2 being a range of 0.5 R1–0.64 R1.

* * * * *

UNITED STATES PATENT AND TRADEMARK OFFICE
CERTIFICATE OF CORRECTION

PATENT NO. : 6,082,405
DATED : July 4, 2000
INVENTOR(S) : Patrik QVARFORDH et al It is certified that error appears in the above-identified patent and that said Letters Patent is hereby corrected as shown below:

On the title page:

Foreign Application Priority Data
Change "July 9, 1996" to --July 11, 1996--

Signed and Sealed this

Eighth Day of May, 2001

Attest:

NICHOLAS P. GODICI

*Attesting Officer*     *Acting Director of the United States Patent and Trademark Office*